United States Patent
Bengtsson

(10) Patent No.: US 7,458,250 B2
(45) Date of Patent: Dec. 2, 2008

(54) ION SENSING ARRANGEMENT FOR SMALL GASOLINE ENGINE

(75) Inventor: Jorgen Bengtsson, Svanskog (SE)

(73) Assignee: Phelon Euro AB, Amal (SE)

( * ) Notice: Subject to any disclaimer, the term of this patent is extended or adjusted under 35 U.S.C. 154(b) by 212 days.

(21) Appl. No.: 11/589,673

(22) Filed: Oct. 30, 2006

(65) Prior Publication Data

US 2007/0247164 A1   Oct. 25, 2007

Related U.S. Application Data

(60) Provisional application No. 60/732,113, filed on Nov. 1, 2005.

(51) Int. Cl.
*G01L 23/22* (2006.01)
(52) U.S. Cl. ...................................................... 73/35.08
(58) Field of Classification Search ................. 73/35.08
See application file for complete search history.

(56) References Cited

U.S. PATENT DOCUMENTS

| | | | |
|---|---|---|---|
| 5,769,049 A | 6/1998 | Nytomt et al. | |
| 6,118,276 A | 9/2000 | Nakata et al. | |
| 6,196,054 B1 | 3/2001 | Okamura et al. | |
| 6,202,474 B1 | 3/2001 | Takahashi et al. | |
| 6,360,587 B1 * | 3/2002 | Noel | 73/35.08 |
| 6,378,494 B1 | 4/2002 | Hatazawa et al. | |
| 6,386,183 B1 | 5/2002 | Lodise et al. | |
| 6,799,557 B2 | 10/2004 | Fewell, Jr. et al. | |

* cited by examiner

*Primary Examiner*—John E Chapman
(74) *Attorney, Agent, or Firm*—Nelson Mullins Riley & Scarborough LLP

(57) ABSTRACT

An ion sensing arrangement for a small internal combustion engine includes an ion sensor placed in the engine's combustion chamber to measure the conductivity of the combusted fuel-air mixture. Scaling circuitry, such as variable voltage divider circuitry, is connected to be in electrical communication with an output of the ion sensor. The scaling circuitry operates to adjust the output signal to a value appropriate for measurement. Preferably, the scaling circuitry adjusts the output signal based on a comparison with a reference value.

17 Claims, 4 Drawing Sheets

ION SENSING ARRANGEMENT FOR SMALL GASOLINE ENGINE

PRIORITY CLAIM

This application claims the benefit of provisional application Ser. No. 60/732,113, filed Nov. 1, 2005, which is relied upon and incorporated herein by reference.

BACKGROUND OF THE INVENTION

The present invention generally relates to ignition systems for small gasoline engines. More particularly, the invention relates to an apparatus for measuring the conductivity of a combusted fuel-air mixture in such an engine.

Large internal combustion engines, such as automobile engines, often include various types of operational sensors. A variety of sensors can be used as inputs to a microprocessor in order to determine efficiency of combustion. In this manner, the engine may finely tune the fuel-air mixture and ignition timing presented to the engine in order to enhance engine efficiency and reduce pollutant output.

Two obstacles not encountered in large engines have impeded the employment of such measuring technology in small gasoline engines typically used on hand-held equipment (e.g., blowers and string trimmers), lawn mowers, pumps, generators and the like. First, any measuring technology employed must be inexpensive because the commoditization of the small engine places a premium on cost of production. Second, in the small engine arena, measuring technology must often operate on limited power because small engines typically do not include a battery to act as a power source. As a result, sophisticated automotive sensors requiring higher levels of power consumption are not feasible.

A currently available measuring technology—ion sensing—provides both low cost and low power consumption. In such an arrangement, the spark plug itself is generally used as the sensor. The various electronics required to detect and interpret the sensor output are simply integrated into the engine control unit or ignition system. Ion-sensing is often used for knock and misfire detection.

A typical ion sensor operates as follows. A power source supplies current across terminals located in the area where conductivity is to be measured. In the case of an internal combustion engine, the sensor is typically located in the chamber in which combustion of the fuel-air mixture occurs. A voltage that rises and falls with the conductivity of the combusted fuel-air mixture is measured across the sensor terminals.

Certain properties of ion sensors, however, have heretofore inhibited their use in carbureted engines. Specifically, unpredictable variations in both fuel quality (due to additives and oxygen content) and the variation of air-to-fuel ratio in non-closed loop air-to-fuel ratio controlled engines causes the conductivity measured by the ion sensor to vary dramatically—up to a magnitude of 100 times. Knock information, however, may be found as a high frequency oscillation overlaid on the falling edge of the ion signal.

Measuring this information with accuracy is extremely difficult. For example, components with an operating span of 0-5V are normally used in logic control circuits. For a signal-to-noise (SN) ratio of 10 to 1, a signal level of 5V means that the circuit design must assume a noise level of 0.5V. If the signal level has a dynamic span of 100 times and a SN ratio of 10 to 1 is used, then the noise level can exceed the signal level. As a result, the system would be unable to obtain information. Similarly, a signal having an amplitude greater than 5V would not yield useful information. In order to compensate for these deficiencies, much higher SN ratios and/or more powerful microprocessors would be necessary. Both of these add cost to the system.

SUMMARY OF THE INVENTION

In one aspect, the present invention provides an ion sensing arrangement for a small internal combustion engine. An ion sensor is placed in the engine's combustion chamber to measure the conductivity of the combusted fuel-air mixture. Scaling circuitry, preferably in the form of variable voltage divider circuitry, is in electrical communication with an output of the ion sensor. The scaling circuitry operates to adjust the output signal to a value appropriate for measurement.

In a preferred embodiment, the voltage divider circuitry comprises a plurality of parallel resistors. Respective switches associated with at least some of the resistors function to selectively add or remove their associated resistors from the voltage divider circuitry. The ion sensing arrangement further includes a controller operative to selectively open and close the respective switches. As a result, the output signal can be reduced to a value appropriate for measurement.

Preferably, the controller may be capable of measuring the ion sensor output and comparing it to a reference value. The controller can then activate or deactivate switches in the voltage divider circuitry based on the comparison. By manipulating the switches, the value of the voltage divider can be actively controlled as the amplitude of the ion sensor's output fluctuates.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
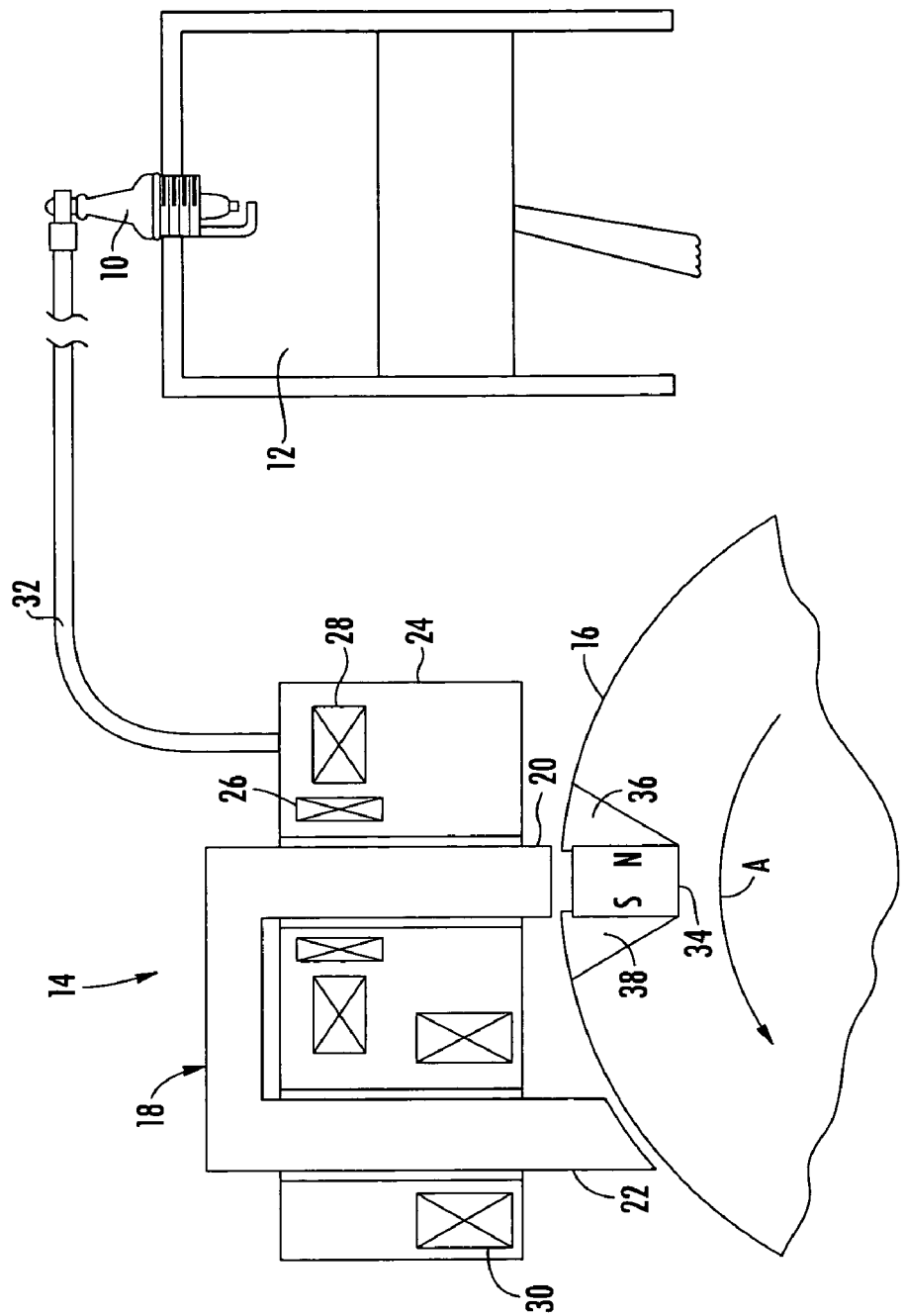
FIG. 1 is a diagrammatic elevational view showing various components of a small engine ignition system.

Repeat use of reference characters in the present specification and drawings is intended to represent same or analogous features or elements of the invention.

DETAILED DESCRIPTION OF A PREFERRED EMBODIMENTS

It is to be understood by one of ordinary skill in the art that the present discussion is a description of exemplary embodiments only and is not intended as limiting the broader aspects of the present invention, which broader aspects are embodied in the exemplary constructions.

FIG. 1 illustrates a discharge ignition apparatus that may be used with various devices powered by gasoline engines. The apparatus is configured to produce the requisite spark at spark plug 10 to ignite the fuel-air mixture within the combustion chamber 12 of the engine. Generally, the apparatus includes a stator unit 14 and a rotatable flywheel 16. Flywheel 16 typically includes a central bore for mounting to a rotatable spindle mechanism interconnected with the engine's drive shaft. As a result, rotation of the spindle will produce a concomitant rotation of flywheel 16 (such as in the direction indicated by arrow A).

Stator unit 14, which typically remains fixed with respect to the engine during use, includes a magnetically permeable core 18. In this case, core 18 includes two depending leg portions, respectively indicated at 20 and 22. In many embodiments, however, the magnetically permeable core may be constructed having three such leg portions.

A sealed housing 24 maintains the various coils and other components utilized to produce a spark at spark plug 10. In particular, housing 24 includes a high voltage transformer having a primary coil 26 and a secondary coil 28. In the illustrated embodiment, coils 26 and 28 may be mounted coaxially about leg portion 20. A charge coil 30 provides a source of energy for the ignition spark. In this case, charge coil 30 is mounted about leg portion 22 as shown.

The various coils and circuit components located within housing 24 may be protected and maintained securely in position by a suitable potting compound. Electrical connection with spark plug 10 is achieved by a typical interconnecting wire 32.

A magnet assembly is mounted adjacent the periphery of flywheel 16 to revolve about a circular path in synchronism with operation of the engine. The magnet assembly includes a permanent magnet 34 having pole pieces 36 and 38 mounted at respective ends thereof. It will be appreciated that the circumferential faces of pole pieces 36 and 38 will pass proximate to the end faces of leg portions 20 and 22 as flywheel 16 is rotated. Rotation of flywheel 16 thus produces a time-varying magnetic flux within core 18 as desired.

Figure 2:
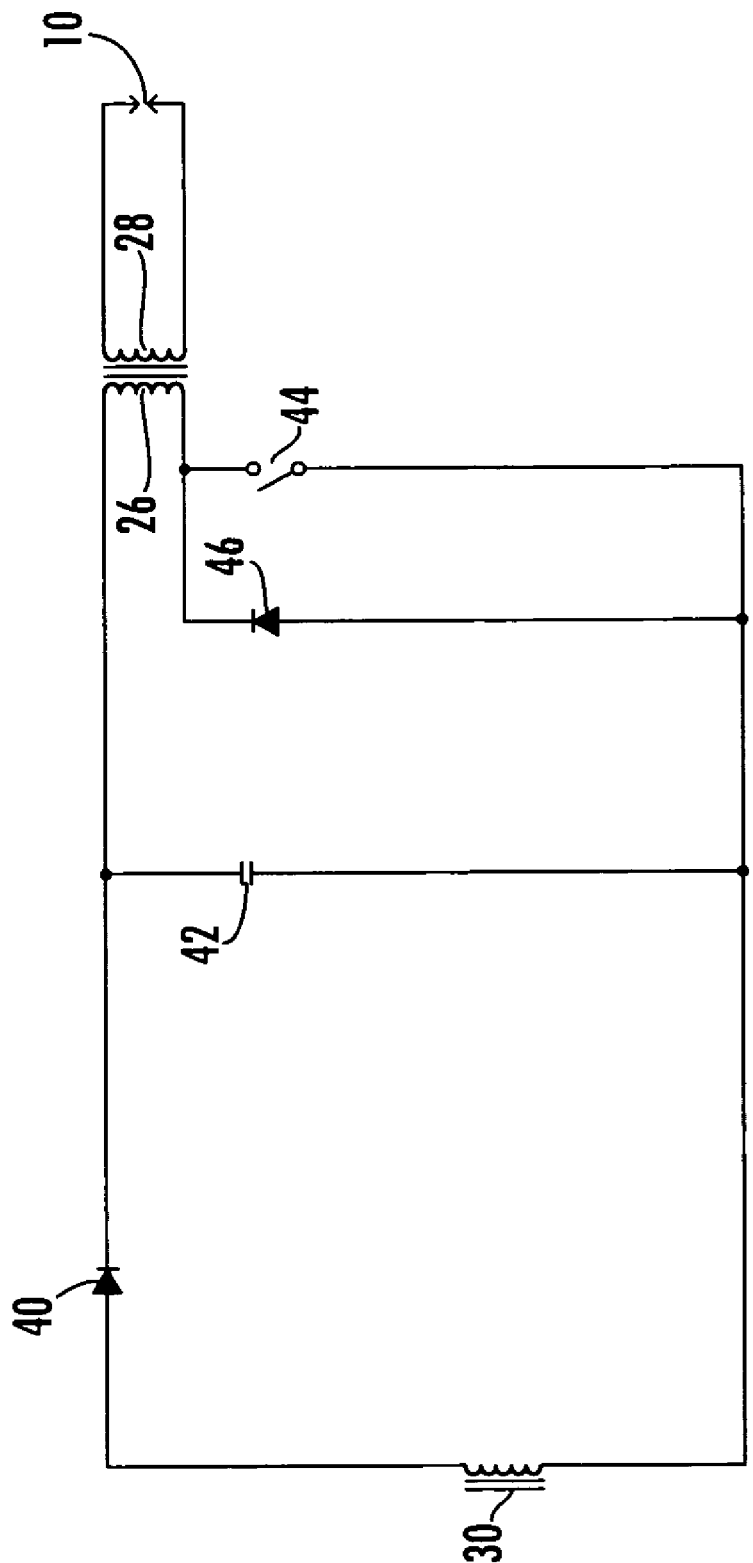
FIG. 2 is a schematic diagram of an ignition system with which the present invention may be used.

A schematic diagram of an exemplary ignition circuit is shown in FIG. 2. The voltage induced in charge coil 30 is rectified by a rectifier diode 40 and stored by capacitor 42. Capacitor 42 is discharged through primary coil 26 and a first switch 44. First switch 44 is controlled by digital or analog circuitry such as suitable control logic to allow conduction through primary coil 26 at the appropriate time. The voltage is stepped up at secondary coil 28, thus producing a spark at spark plug 10. Diode 46 is an anti-parallel diode.

Figure 3:
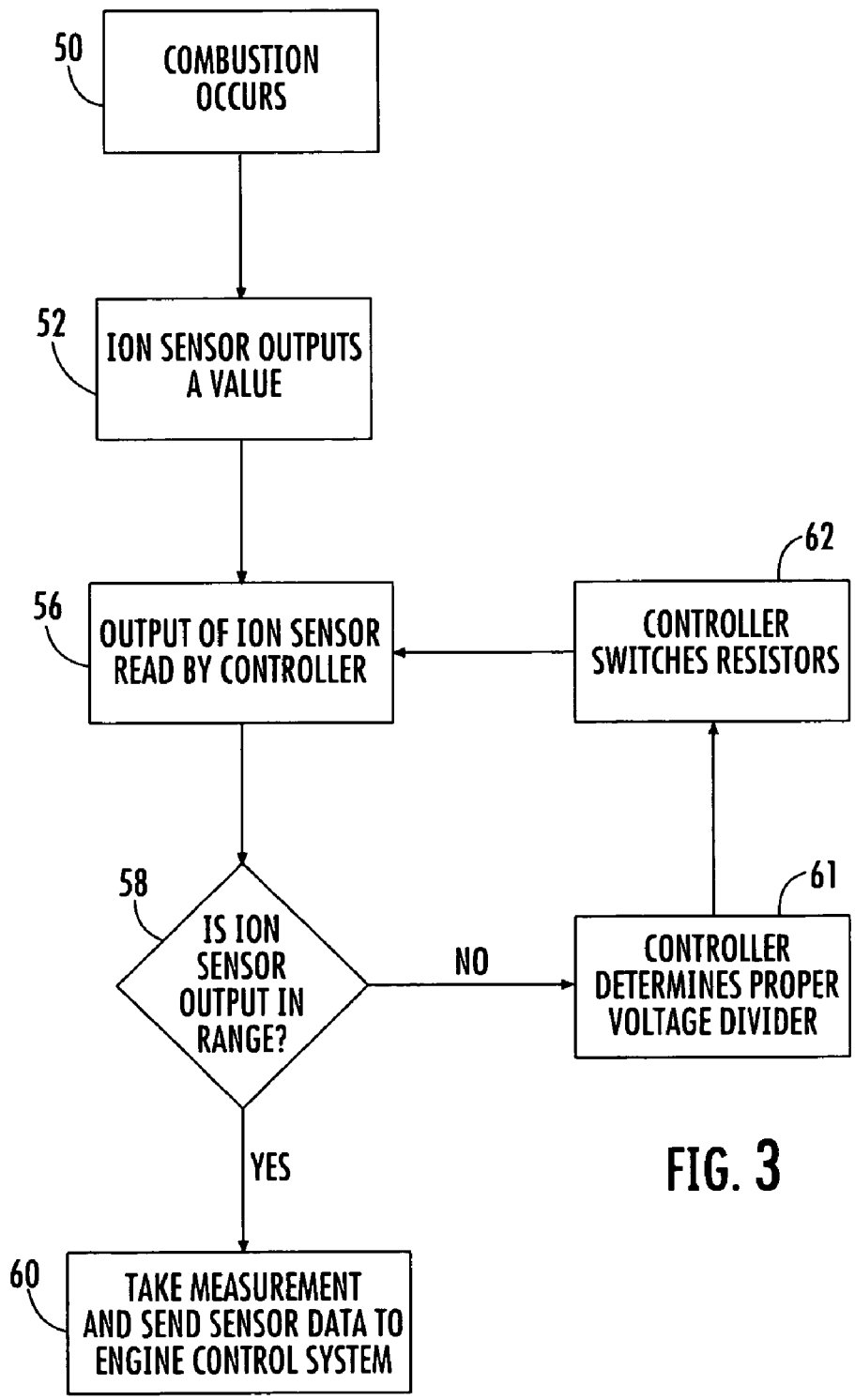
FIG. 3 is an exemplary flow chart illustrating a process in accordance with the invention for controlling the circuitry of the voltage divider.

FIG. 3 is a flow chart illustrating a process by which the present invention may obtain an accurate measurement of the output of an ion sensor in a small carbureted engine. As indicated at 50, the process begins with the occurrence of combustion in the engine's combustion chamber. The ion sensor (preferably the spark plug) then outputs a voltage indicative of the conductivity of the combusted fuel-air mixture, as indicated at 52.

Next, as indicated at 56, the controller compares the voltage output to a reference value. The controller thus determines whether the voltage output is within a predetermined range for accurate measurement (as indicated at 58). If the voltage output is within the desired range, the measuring circuitry takes the final measurement 60. This measurement can be communicated to the engine control system that makes any necessary adjustments to operating parameters.

If the output voltage is not in range, the controller determines the voltage divider ratio that will result in a desired voltage (as indicated at 61). If that judgment cannot be made, the controller increases or decreases the divider ratio to the next increment depending upon whether the input voltage is over range or under range. As indicated at 62, switches are opened or closed to vary the number of parallel resisters in the voltage divider circuitry. The output of the ion sensor is then read and the process repeated until the voltage at the measuring device is at the desired level.

Preferably, these steps may be performed at the time the engine is started so that the measurements will be in range for subsequent operation. In a preferred embodiment, all of the switchable resistors will be out of circuit when the engine is started to provide the highest level for the measured signal. If the signal is too high, subsequent resistors are connected into the circuit in seriatim during subsequent cycles. When the measured signal is first in range, the process is concluded. The measured signal can then be used to monitor engine parameters.

Figure 4:
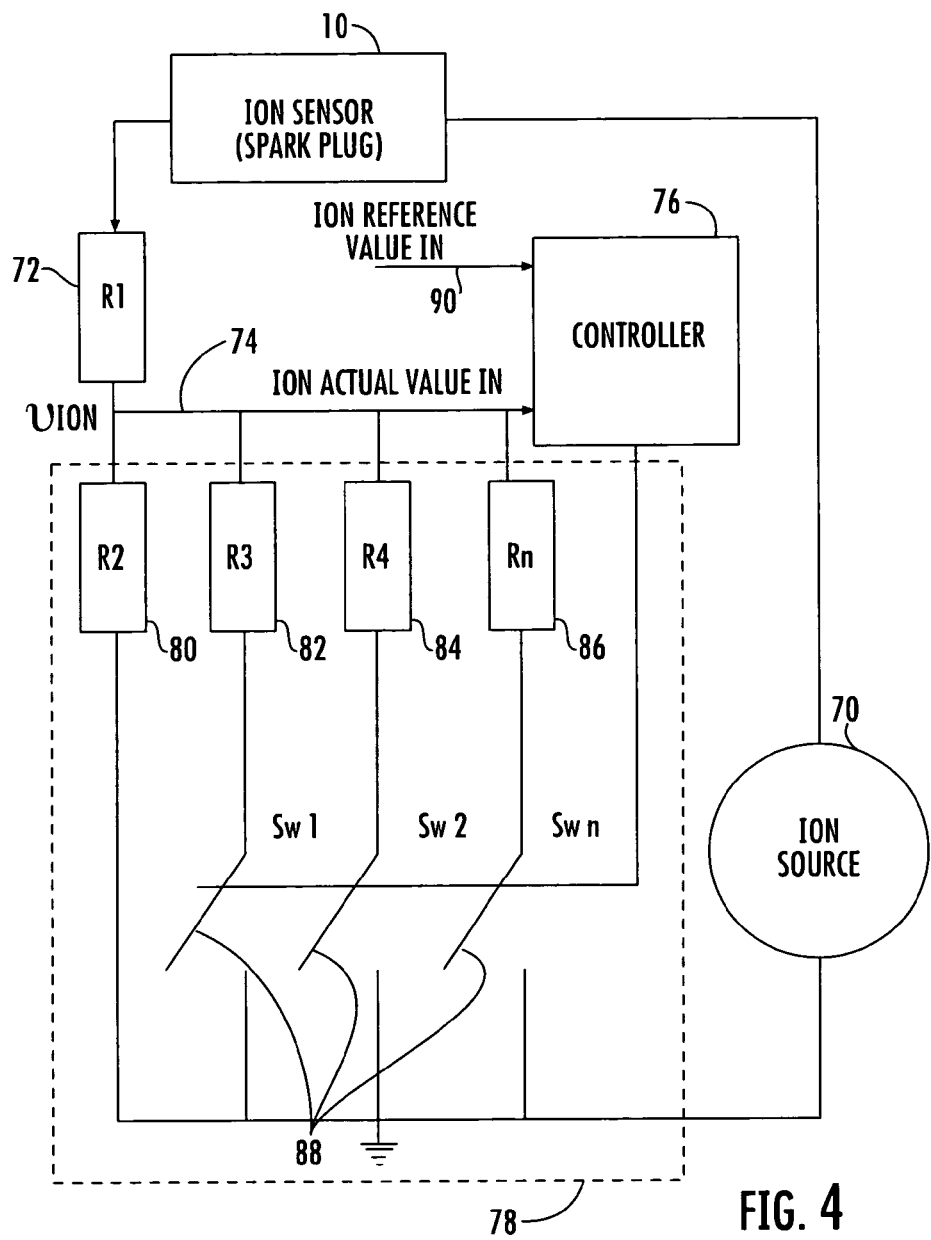
FIG. 4 is a schematic diagram of an exemplary sensing arrangement in accordance with the present invention.

FIG. 4 is a diagrammatic representation of a preferred circuit arrangement constructed in accordance with the present invention. As can be seen, the circuit includes a suitable ion source 70. Ion source 70 may be any power source appropriate for supplying current to the system including, but not limited to, a capacitor or a battery. For example, presently preferred embodiments utilize a capacitor connected in circuit with the secondary coil and charged by revolution of magnet 34. Such a capacitor may be charged, for example, by the ignition coil during the spark event. After the spark event, the capacitor will discharge its energy through the spark plug where now conductive gas is present between the electrodes allowing a current path between the electrodes.

Ion source 70 supplies power to an ion sensor (e.g. spark plug 10) situated in the engine's combustion chamber. (While the ion sensor may often be the engine spark plug, embodiments are contemplated in which other sensors are used.) The output of the ion sensor is connected through resistor R1 (also indicated as 72) to a node 74 at which a controller 76 and scaling circuitry 78 are connected.

The ion sensor outputs a voltage signal that corresponds with the conductivity of the combusted fuel-air mixture in the combustion chamber. The waveform produced at the ion sensor typically consists of a lower frequency fundamental having smaller oscillations superimposed thereon. Accurate measurement of oscillations often provides the data that is required to adjust the engine's operating parameters for maximum efficiency. For example, these smaller oscillations may indicate engine knock.

The functionality of scaling circuitry 78 will now be explained. In this embodiment, scaling circuitry 78 is configured as voltage divider circuitry having a plurality of resistors R2, R3, R4, . . . RN (also indicated as 80, 82, 84 and 86, respectively) connected in parallel to one another. The common node 74 of resistors R2, R3, R4, . . . RN is connected to controller 76, as noted above. Except for resistor R2, each resistor is connected to the circuit through a respective switch 88 that is selectively operated by controller 76. Preferably, switches 88 may comprise respective MOSFETs or other electronic switching elements.

As controller 76 opens and closes respective switches 88, the voltage signal at node 74 increases or decreases in accordance with the number and value of the resistors that are switched into the circuit. This allows the circuit to set the scaling circuitry 78 to a desired level so that small changes in the voltage across the device may be accurately measured.

Controller 76, which may comprise hardware, firmware, software or combinations thereof, measures the voltage across scaling circuitry 78 and compares it to a reference value input at 90. (As one skilled in the art will appreciate, controller 76 may included internal amplification to amplify the signal at node 74 prior to the comparison with the reference value.) Controller 76 uses this comparison to determine the appropriate voltage divider value to bring the measurement to a desired level. If necessary, controller 76 manipulates one or more of the switches 88 in order to achieve this goal. Controller 76 will continue to compare the voltage to one or more reference values and modify the voltage divider until the divider ratio yields an output level that is suitable for measurement. This level may vary depending on the type of information to be extracted.

The signal to be measured, $v_{ion}$, is determined at node 74 as shown. This signal can then be used to determine combustion related information for engine control and other purposes. The above-described arrangement keeps the signal at the appropriate level for the needed signal-to-noise ratio. In particular, the dynamic span of the ion current is controlled by comparing the actual value with a maximum value. The value of the voltage divider changes to adjust the actual value as close as possible to the maximum value.

In an exemplary embodiment using three switchable resistors, eight steps are available. By choosing suitable resistor values and number of steps, it is possible to achieve control of the dynamic span for the ion signal to the needs of signal processing. The number of switchable resistors could be more or less depending upon the levels of amplification needed so that measuring accuracy could be kept at an appropriate level.

One skilled in the art will appreciate that the present invention allows the monitoring of the combustion cycle of a small engine for efficiency without introducing components that significantly increase the production cost of the engine. While preferred embodiments of the invention have been shown and described, modifications and variations may by made thereto by those of skill in the art without departing from the spirit and scope of the present invention. It should also be understood that aspects of various embodiments may be interchangeable in whole or in part. Furthermore, those of ordinary skill in the art will appreciate that the foregoing description is by way of example only, and is not intended to be limitative of the invention.

What is claimed is:

1. An ion sensing arrangement for a small internal combustion engine comprising:
   an ion sensor situated in the engine's combustion chamber;
   scaling circuitry in electrical communication with said ion sensor;
   said scaling circuitry being operative to adjust a measured output of said ion sensor to a selected level; and
   a controller operative to vary said scaling circuitry so as to effect adjustment of said measured output.

2. An ion sensing arrangement as set forth in claim 1, wherein said scaling circuitry comprises variable voltage divider circuitry.

3. An ion sensing arrangement as set forth in claim 2, wherein said variable voltage divider circuitry comprises a plurality of parallel resistors.

4. An ion sensing arrangement as set forth in claim 3, wherein respective switches are associated with at least some of said parallel resistors, each said switch being operative to connect said associated resistor into and out of circuit.

5. An ion sensing arrangement as set forth in claim 4, wherein each said switch comprises an electronic switching element.

6. An ion sensing arrangement as set forth in claim 1, wherein said controller is operative to compare said measured output of said ion sensor to a reference value.

7. An ion sensing arrangement as set forth in claim 6, wherein said reference value represents a maximum threshold amplitude of said measured output of said ion sensor.

8. An ion sensing arrangement as set forth in claim 1, wherein said ion sensor comprises a spark plug.

9. An ion sensing arrangement for an internal combustion engine comprising:
   a spark plug situated in the engine's combustion chamber;
   said spark plug being operative as an ion sensor to detect an ion signal;
   variable voltage divider circuitry comprising a plurality of parallel resistors;
   electrical switching elements associated with at least some of said parallel resistors to connect said associated resistors in and out of circuit; and
   a controller operative to vary said variable voltage divider circuitry so as to effect adjustment of said ion signal to a selected level.

10. An ion sensing arrangement as set forth in claim 9, wherein said controller is operative to compare a measured output of said ion sensor to a reference value.

11. An ion sensing arrangement as set forth in claim 10, wherein said reference value represents a maximum threshold amplitude of said measured output of said ion sensor.

12. A method of adjusting a measured output of an ion sensor in an internal combustion engine, said method comprising steps of:
   (a) detecting said measured output of said ion sensor;
   (b) comparing said measured output with a reference value;
   (c) scaling said measured output to have a maximum amplitude approximating said reference value; and
   (d) utilizing said measured output as scaled to control at least one engine parameter.

13. A method as set forth in claim 12, wherein said reference value is a threshold maximum.

14. A method as set forth in claim 12, wherein step (c) is performed by variable voltage divider circuitry.

15. A method as set forth in claim 14, wherein said variable voltage divider circuitry comprises a plurality of parallel resistors.

16. A method as set forth in claim 15, wherein respective switches are associated with at least some of said parallel resistors, each said switch being operative to connect said associated resistor into and out of circuit.

17. A method as set forth in claim 16, wherein each said switch comprises an electronic switching element.

* * * * *